Patented Jan. 20, 1953

2,626,250

UNITED STATES PATENT OFFICE 2,626,250

SURFACE COATING COMPOSITION AND PROCESS FOR PREPARING THE SAME

John C. Petropoulos, South Norwalk, and Leonard E. Cadwell, Stamford, Conn., assignors to American Cyanamid Company, New York, N. Y., a corporation of Maine No Drawing. Application May 13, 1950, Serial No. 161,898

20 Claims. (Cl. 260—22)

This invention relates to oil-modified alkyd resins and, more specifically, to vinyl monomers and oil-modified alkyd resins and the processes of preparing the same. More specifically, this invention relates to modified alkyd resins which have been prepared by reacting a saturated polycarboxylic acid, a polyhydric alcohol and a non-conjugated oil or a non-conjugated oil acid until substantially complete esterification is accomplished, and thereafter reacting the alkyd resin thus produced with a monomeric vinyl compound which must contain at least a fixed amount of a certain type of vinyl monomer, selected from the group diallyl fumarate or diallyl maleate. This invention further relates to surface coating compositions comprising the particular modified alkyd resins thus produced in accordance with the process of the present invention.

One of the objects of the present invention is to produce a surface coating composition which will yield clear solutions in mineral spirits, and which will air-dry or bake to clear, homogeneous films. A further object of the present invention is to produce certain surface coating compositions which are the homogeneous copolymerization products of diallyl fumarate or diallyl maleate, with other vinyl compounds, coreacted with non-conjugated oil-modified alkyd resins. A still further object of the present invention is to produce the copolymer resins as identified hereinabove which will show improved chemical resistance, improved gasoline resistance, and improved mar resistance, compared with the previously-known styrenated alkyd resins. A still further object of the present invention is to produce, as novel compositions of matter, copolymers of a vinyl compound, including at least a portion of diallyl fumarate or diallyl maleate in copolymerization with the esters of non-conjugated oil-modified alkyd resins, which may be used in a variety of different applications, such as in surface coatings, ink vehicles, floor finishes (such as linoleum or varnishes and the like). These and other objects of the present invention will be discussed more fully hereinbelow in the subsequent disclosure of the present invention.

In the preparation of the compositions of the present invention, it is desirable to prepare first the alkyd resin itself by coreacting a polycarboxylic acid with a polyhydric alcohol in the presence of a non-conjugated oil, or the fatty acids derived therefrom but particularly those oils or acids which have an iodine number between about 120 and 190. The oil-modified alkyd resin thus produced may then be coreacted with a mixture of monomeric diallyl fumarate and/or diallyl maleate and a monomeric vinyl compound other than diallyl fumarate and/or diallyl maleate, until substantially all of the monomeric compounds have been coreacted with the oil-modified alkyd resin. It is essential in the practice of the process of the present invention, that the oil-modified alkyd resin be prepared by using exclusively a polycarboxylic acid selected from saturated polycarboxylic acids and phthalic acid. Strictly speaking, phthalic acid is an unsaturated polycarboxylic acid but it functions, in many respects, in the same manner as a saturated polycarboxylic acid, as distinguished from the reactivity of alpha, beta unsaturated carboxylic acids, such as maleic and fumaric. Because of its similarity to saturated acids from the standpoint of functionality, phthalic acid is categorized in the present case with the other saturated polycarboxylic acids. In the place of the acids per se, the anhydrides of those acids may be used. Specific mention of the acids in the specification and in the claims includes the anhydrides.

By using these saturated polycarboxylic acids or phthalic acid one obtains, through esterification with the polyhydric alcohol, resinous products which do not copolymerize, in and of themselves, with the monomeric vinyl compounds which are subsequently added. By use of the non-conjugated oils or their non-conjugated fatty acids in the esterification reaction, one obtains copolymerization with the monomeric vinyl compounds through the unsaturation of the oil or oil acid chain. This copolymerization may be, and in certain instances is, not a complete interaction between the oil modified alkyd resin and the monomeric vinyl compounds for there very probably is some homopolymerization of the monomeric vinyl compounds in an action independent of simultaneous copolymerization reactions that take place between the alkyd resin and the vinyl monomers. It is believed that the interaction by copolymerization of the alkyd resin with the vinyl monomers produces a resultant end product which is compatible with the homopolymerized vinyl monomers so that the total resultant end product actually is a compatible homogeneous mixture of the homopolymerized vinyl monomers and the copolymerized vinyl monomers and alkyd resin. All of the proportions by weight which have been set forth hereinabove and which shall be set forth hereinbelow with respect to the vinyl monomers generally and specifically with respect to diallyl fumarate and diallyl maleate refers to the total amount of monomers used in the course of the reaction whether it actually engages in a copolymerization or in a homopolymerization.

The applicants have discovered that a certain minimum amount of diallyl fumarate or diallyl maleate must be used as a part of the vinyl monomer present in the copolymerization reaction. This amount of the diallyl fumarate or diallyl maleate must be between 3% and 17.5% by weight, based on the total weight of the final copolymerization reaction product. It has been stated, hereinabove, that the polycarboxylic acid which must be used in the practice of the process of the present invention must consist essentially of a member of the group saturated polycarboxylic acids and phthalic acid, and the polycarboxylic acid should be present in an amount varying between about 15–45% by weight, based on the total weight of the oil-modified alkyd resin. The oil which is used in the preparation of the oil modified alkyd resin must consist of non-conjugated oils essentially and should be present in an amount varying between about 30–65% by weight, based on the total weight of the oil modified alkyd resin. In order that the present invention may be more completely understood, the following examples are set forth for the purpose of illustration only, and any limitations contained therein should not be interpreted as limitations on the case except as indicated in the appended claims, as it is obvious that their specific enumeration and detail is solely for the purpose of illustration. All parts are parts by weight.

ALKYD RESIN A 148 parts of phthalic acid anhydride, 185 parts of soya monoglyceride, 77 parts of soya oil, and 38 parts of glycerin are introduced into a suitable reaction chamber and heated until substantially complete esterification has been accomplished, which may be determined by acid number. In this instance, the acid number was determined at 10.6, at which point, the viscosity of a 60% solids solution of the resin in Varsol No. 1 (a high-boiling aliphatic hydrocarbon) was approximately X–Y on the Gardner-Holdt scale at 25° C. The Gardner-1933 Color was approximately 6–7.

Example 1

60 parts of the above-identified alkyd resin A and 82 parts of xylol are charged into a suitable reaction chamber and heated to reflux temperature. To this mixture there is added a mixture of 30 parts of styrene, 10 parts of diallyl fumarate, and 2 parts of cumene hydroperoxide. This addition is accomplished over a one hour period. The resin solution is held at reflux temperature for a six and one-half hour period. At the end of this period, the resin solution had a clear appearance. The appearance of an air-dried film, produced by this resin solution, also was clear.

ALKYD RESIN B 148 parts of phthalic acid anhydride, 363 parts of Neofat D-142 (fatty acid fraction of talloil), and 116 parts of pentaerythritol are introduced into a suitable reaction chamber equipped with thermometer and stirrer, and the mixture is heated until esterification is substantially completed. In this instance, esterification was substantially completed at an acid number of 9:6. At this point, the viscosity of a 65% solids solution in Varsol No. 1 was approximately Y on the Gardner-Holdt scale at 25° C.

Example 2

60 parts of the alkyd resin B, 100 parts of xylol were introduced into a suitable reaction chamber equipped with thermometer, stirrer, and reflux condenser, and the charge was heated up to reflux temperatures. To this mixture was then added a mixture of 30 parts of styrene, 10 parts of diallyl fumarate and 2 parts of cumene hydroperoxide. This addition is accomplished over a one-hour period. After this addition has been completed, and the resin solution is maintained at reflux for a period of about seven hours, the appearance of the resin solution is clear, and the appearance of the air-dried film produced therefrom is clear.

ALKYD RESIN C 148 parts of phthalic acid anhydride, 50 parts of crotonic acid, 400 parts of refined soya acids, and 156 parts of pentaerythritol are introduced into a suitable reaction chamber and heated until substantially complete esterification is accomplished. In this instance, the final acid number is 3.0. A 60% solids solution of the resultant resin solution in Varsol No. 1 had a viscosity of about J on the Gardner-Holdt scale at 25° C.

Example 3

60 parts of the alkyd resin C and 82 parts of xylol are introduced into a suitable reaction chamber equipped with thermometer, stirrer and reflux condenser. Then the mixture is heated to reflux temperature. To this mixture there is added a mixture consisting of 30 parts of styrene, 10 parts of diallyl fumarate and 0.5 part of 2,2-bis(tertiarybutylperoxy)butane. This addition is accomplished over about a one-hour period. The resin and monomers are copolymerized until substantially all of the monomer is coreacted. The resultant resin solution has a clear appearance and the air-dried film produced therefrom is also clear in appearance.

Example 4

60 parts of alkyd resin C and 82 parts of mineral spirits are introduced into a suitable reaction chamber equipped as in the other examples and the mixture is heated up to the reflux temperature. To this mixture there is then added a mixture consisting of 30 parts of styrene and 10 parts of diallyl fumarate and 2 parts of cumene hydroperoxide. This addition is accomplished in about a one-hour period and the total mixture is then continually heated at reflux temperature until substantially all of the styrene and diallyl fumarate monomers have been coreacted with the alkyd resin, which can be accomplished in approximately 6–7 hours. The resultant resin solution is of a clear appearance and the air-dried films produced therefrom are also clear in appearance.

Example 5

60 parts of alkyd resin C and 82 parts of xylol are introduced into a suitable reaction chamber and heated to the reflux temperature, whereupon a mixture of 30 parts of styrene, 10 parts of diallyl fumarate and 2 parts of cumene hydroperoxide are introduced gradually to the sphere of reaction while the reflux temperature is being maintained. This addition of the monomer and catalyst can be accomplished in about a one-hour period. The mixture is then heated continuously at reflux temperatures until 95–100% of the monomeric materials have coreacted and copolymerized with the oil-modified alkyd resin. The resultant resin solution and the air-dried film produced therefrom are both clear in appearance.

ALKYD RESIN D 148 parts of phthalic acid anhydride, 100 parts of crotonic acid, and 400 parts of Neofat D-142, 178 parts of pentaerythritol are introduced into a suitable reaction chamber, equipped as above, and reacted together until the acid number is approximately 6.4. At this point, a 60% solids solution of the resin in Varsol No. 1 is approximately X on the Gardner-Holdt scale at 25° C.

Example 6

60 parts of resin D and 60 parts of mineral spirits are introduced into a suitable reaction chamber equipped as above and the mixture is heated to the reflux temperature. Whereupon, a mixture of 30 parts of styrene, 10 parts of diallyl fumarate and 2 parts of cumene hydroperoxide are added slowly over about a one-hour period. The mixture is then heated at the reflux temperature until substantially all of the monomeric materials have coreacted with the oil-modified alkyd resin. Again, the resultant resin solution and the air-dried films produced therefrom are clear in appearance.

ALKYD RESIN E 148 parts of phthalic acid anhydride, 220 parts of Neofat D-142 and 97 parts of glycerin are introduced into a suitable reaction chamber equipped with thermometer and stirrer, and the mixture is heated until substantially complete esterification is accomplished, which is indicated by a final acid number of about 7.2. The resultant resin in a 60% solids solution in Varsol No. 1 has a viscosity of about Z-2 on the Gardner-Holdt scale at 25° C.

Example 7

60 parts of resin E and 100 parts of xylol are introduced into a suitable reaction chamber and the mixture is heated to the reflux temperature, whereupon a mixture of 30 parts of monomeric styrene and 10 parts of monomeric diallyl fumarate and 1 part of 2,2-bis(tertiarybutylperoxy)-butane are added slowly over about a one-hour period. The mixture is then heated at the reflux temperature until the monomeric material has substantially completely copolymerized with the oil-modified alkyd resin. Again, in this instance, the resin solution and the air-dried film produced therefrom are clear in appearance.

In the past, it has been convention to prepare copolymers of vinyl monomers and alkyd resins modified with conjugated fatty acids and conjugated oils but in the production thereof, certain undesirable effects were often associated with the resins thus produced, such as the tendency for gelation to occur before all the monomer was polymerized, poor stability, lengthy reaction time, gas checking, poorer gloss, and greater reactivity of pigmented composition containing these vehicles. In the practice of the process of the present invention, it is possible to prepare satisfactory products from alkyd resins which have been modified solely with non-conjugated fatty acids, in which these numerous undesirable effects, which are generally associated with the resins containing conjugated acids, are eliminated. In the past, it has been indicated that it was necessary to use substantial amounts of these conjugated fatty acids in the modifications of alkyd resins in order to produce clear, air-dried and baked films by the preparation of the styrene-alkyd-copolymer resins. The applicants have, however, eliminated the necessity of using any conjugated fatty acids or conjugated fatty oils by the practice of their process, wherein they are able to retain the clear air-dried, clear film characteristics while further improving the product by the elimination of the undesirable effects as mentioned above. It should be noted that the use of the expression non-conjugated oils includes the non-conjugated acids derived therefrom.

In the practice of the process of the present invention, it is imperative that the polycarboxylic acid present be a saturated polycarboxylic acid. Amongst the other saturated polycarboxylic acids which may be used are oxalic, malonic, succinic, glutaric, sebacic, adipic, pimelic, suberic, azelaic, tricarballylic, citric, tartaric, and malic. The saturated polycarboxylic acids may be present in the amount of about 15–45% by weight, based on the total weight of the oil-modified alkyd resin.

There is no limitation as far as the type of polyhydric alcohol which may be used in the practice of the process of this invention. Such alcohols as diethylene glycol, ethylene glycol, trimethylene glycol, tetramethylene glycol, pinacol, arabitol, xylitol, adonitol, mannitol, glycerol, trimethylol propane, trimethylol ethane, sorbitol, and pentaerythritol may be used. The amount of polyhydric alcohol which may be used is not critical. However, there should be a sufficient amount of polyhydric alcohol present, and preferably even a slight excess over the calculated amounts necessary for substantially complete esterification in order to produce a coreaction product with the polycarboxylic acid and the oil or oil acids present, so that the acid number in the final resultant oil-modified alkyd resin is fairly low, indicating that substantially complete esterification has been accomplished.

In the copolymerization of the oil-modified alkyd resin and the vinyl monomeric mixture containing certain stated proportions of diallyl fumarate and/or diallyl maleate, it is imperative that a solvent be used. In the preparation of the alkyd per se, it is not necessary to use a solvent. In the copolymerization, however, one must have at least 20% and not more than 60% of solvent present by weight based on the total weight of the copolymerizable reactants and solvents combined. This means that there will not be less than 40% solids reactable material and not more than 80% solids reactable material by weight based on the total weight of copolymerizable reactants and solvent. It is actually preferred that the amount of solvent present be within the range of 35%–55% by weight of solvent based on the total weight of the copolymerizable reactants and solvent combined This means that it is preferred that the total solids of copolymerizable reactants should be preferably within the range of 45–65% by weight based on the total weight of copolymerizable reactants and solvent combined. Amongst those solvents which may be used are those which have boiling points of at least 100° C. The upper range of boiling points of the solvent is immaterial and will be determined only by its solvency power and compatibility for the copolymerizable reactants. Amongst the solvents which may be used are hydrocarbons, ethers, esters of aliphatic and aromatic acids, mixtures of alcohols and hydrocarbons and the like. More specifically, those solvents which may be used are such compounds as acetonyl acetone, amyl acetate, amyl cyclohexanol, amyl ether, amyl propionate, butyl acetate, butyl carbitol, monobutyl ether of ethylene glycol, monobutyl ether mono acetate of ethylene glycol, monoethyl ether of diethylene glycol, monoethyl ether of ethylene glycol, diethyl ether of diethylene glycol, diethyl ether of ethylene glycol, diethylene glycol, diethylene glycol diacetate, diethylene glycol monomethyl ether, diethylene glycol monobutyl ether acetate, diethylene glycol monoethyl acetate, dipentyl ketone, ethylene glycol monobenzyl ether, ethylene glycol diethyl ether, ethylene glycol monoethyl ether acetate, methyl propyl ketone, triacetin and the like. These organic solvents should be inert for all practical purposes with respect to the copolymerizable reactants. In addition to those solvents set forth hereinabove, any of the various hydrocarbon solvents, derived from either petroleum or coal tar may be used such as the kerosene, naphthas, and the like.

The oil or oil acids which may be used in the practice of the process of the present invention must consist essentially of the non-conjugated oils or their oil acids, and preferably those which have an iodine number between about 120 and 190. Included in the group of oils which may be used are linseed oil, menhaden oil, hempseed oil, grape seed oil, corn oil, cod liver oil, candlenut oil, walnut oil, perilla oil, poppy seed oil, safflower oil, sunflower oil, and the like. The amount of the oil which is used should be in the order of about 30–65% by weight, based on the total weight of the oil-modified alkyd resin.

In the copolymerization of the monomeric materials with the oil-modified alkyd resin, it is generally preferred that a catalyst be used, in order that the products produced will have the desired utility, and in order that the processing may be accomplished with the minimum of effort and time. These catalyst materials may be employed in amounts varying between about 0.5% to about 5%, based on the total weight of the coreaction materials. For optimum results, it is generally preferred to use about 1% to about 2% of such catalysts as 2,2-bis(tertiarybutylperoxy)butane, tertiarybutylhydroperoxide, ditertiarybutylperoxide, tertiarybutylpropylperoxide, tertiarybutylpentamethyl-ethylperoxide, and the like.

It has been stated hereinabove that in the practice of the process of the present invention, it is preferred to use a polycarboxylic acid which is selected from the group consisting of saturated polycarboxylic acids and phthalic acid. This limitation on the case specifically excludes those polycarboxylic acids which have active unsaturation adjacent to, or remote from, the carboxylic groups. However, one may use as a modifier monocarboxylic acids which have alpha,beta unsaturation, such as crotonic acid, vinyl-acetic acid, 4-methylhexene-4-olic acid, 5-methylhexyl-diene-2,4-olic acid, and the like. If one elects to use an alpha,beta unsaturated, or a beta-gamma unsaturated monocarboxylic acid, one should not use more than 50% by weight, based on the total weight of the oil portion of the alkyd resin. In the use of these unsaturated monocarboxylic acids, one may further modify the compositions of the present invention by using a greater field of oils, such as those commonly referred to as non-drying oils.

Amongst the vinyl compounds which may be used in the practice of the process of the present invention, along with diallyl fumarate and/or diallyl maleate, are such materials as allyl alcohol, methylvinyl-carbinol, allyl-carbinol, vinylethyl-carbinol, methylallyl-carbinol, beta-allylethyl alcohol, and the unsaturated alcohol ethers of organic acids such as allyl acetate, allyl propionate, allyl butyrate, allyl acrylate, methallyl acetate, methallyl butyrate, methylallyl valerate, and other comparable esters of saturated and/or unsaturated aliphatic and aromatic, monobasic and polybasic acids, such as crotonic, glutaric, oxalic, maleic, adipic, pimelic, sebacic, azeleic, and the like. Additionally, one may use as a monomeric vinyl compound, styrene, acrylonitrile, acrylic acid esters, methacrylic esters, methacrylonitrile, monochloro styrene, dichloro styrene, ring substituted methyl styrenes such as 2,4 dimethyl styrene, vinyl esters such as vinyl acetate, vinyl chloride, and the like. It has been stated hereinabove that the amount of the vinyl compound which should be used in the preparation of these vinyl monomer and oil-modified alkyd resins should be in the order of magnitude of about 30–50% by weight, based on the total weight of the final reaction product. Of this weight of monomeric vinyl compound, there must be at least 3% and not more than 17.5% by weight, and preferably 6–12% by weight based on the total weight of the final reaction product, of either diallyl fumarate and/or diallyl maleate. The applicants have found that, along with the other limitations on the case, which have been specifically set forth hereinabove, these proportions of the vinyl monomeric compounds generally, and of these in particular two diallyl esters, must be observed in order that the results be accomplished, which they have discovered.

The oil modified alkyds which are used in the practice of the process of the present invention may be prepared by practically any of the conventional processes such as by the alcoholysis process, wherein the polyhydric alcohol and the non-conjugated oil are reacted to form a partial ester of the polyhydric alcohol which is subsequently esterified with the polycarboxylic acid, or by the fatty acid process wherein the polycarboxylic acid, polyhydric alcohol and fatty acid are esterified simultaneously. Another method which can be accomplished is the acidolysis process, wherein the polycarboxylic acid and the oil are heated in the presence of an acid catalyst and the subsequent esterification of the mixture by the slow, gradual, constant addition of a polyhydric alcohol. These and other means of preparing the oil modified alkyd, which is used in the present invention, may be adopted and it should be clear from this that the actual preparation of the oil modified alkyd resin itself is not critical provided that the reactants are maintained within the confines of the invention as hereinabove disclosed with respect to kind and amount.

We claim:

1. A process of preparing a vinyl monomer and oil-modified alkyd resin comprising reacting, in the presence of an inert organic solvent, an oil modified alkyd resin with 30–50% by weight, based on the total weight of the final reaction product, of a monomeric vinyl compound consisting of between 3–17.5% by weight, based on the total weight of the final reaction product, of a member of the group consisting of diallyl fumarate and diallyl maleate, wherein said oil-modified alkyd resin is the reaction product of a polycarboxylic acid, a polyhydric alcohol and a glyceride oil, wherein said polycarboxylic acid consists essentially of a member of the group consisting of saturated polycarboxylic acids and phthalic acid, and is present in an amount varying between 15-45% by weight, based on the total weight of the oil-modified alkyd resin, said oil consists essentially of a non-conjugated oil having an iodine number between 120-190, and is present in an amount varying between 30-65% by weight based on the total weight of said oil-modified alkyd resin and said inert solvent, having a boiling point of at least 100° C., is present in an amount varying between 20-60% by weight based on the total weight of solvent and reactants.

2. A process of preparing a vinyl monomer and oil-modified alkyd resin comprising reacting in the presence of an inert organic solvent, an oil modified alkyd resin with 30-50% by weight, based on the total weight of the final reaction product, of a monomeric vinyl compound consisting of between 3-17.5% by weight, based on the total weight of the final reaction product of a member of the group consisting of diallyl fumarate and diallyl maleate, wherein said oil-modified alkyd resin is the reaction product of a polycarboxylic acid, a polyhydric alcohol and a glyceride oil, wherein said polycarboxylic acid consists essentially of phthalic acid, and is present in an amount varying between 15-45% by weight, based on the total weight of the oil-modified alkyd resin, and said oil consists essentially of a non-conjugated oil having an iodine number between 120-190 and is present in an amount varying between 30-65% by weight, based on the total weight of said oil-modified alkyd resin and said inert solvent, having a boiling point of at least 100° C., is present in an amount varying between 20-60% by weight based on the total weight of solvent and reactants.

3. A process of preparing a vinyl monomer and oil modified alkyd resin, comprising reacting in the presence of an inert organic solvent, an oil modified alkyd resin with 30-50% by weight, based on the total weight of the final reaction product, of a monomeric vinyl compound, consisting of between 3-17.5% by weight, based on the total weight of the final reaction product, of a member of the group consisting of diallyl fumarate and diallyl maleate, wherein said oil modified alkyd resin is the reaction product of a polycarboxylic acid, a polyhydric alcohol and a glyceride oil, wherein said polycarboxylic acid consists essentially of a member of the group consisting of saturated polycarboxylic acids and phthalic acid, and is present in an amount varying between 15-45% by weight, based on the total weight of the oil modified alkyd resin, and said oil consists essentially of linseed oil, is present in an amount varying between 30-65% by weight, based on the total weight of said oil modified alkyd resin, and said inert solvent having a boiling point of at least 100° C. is present in an amount varying between 20-60% by weight based on the total weight of solvent and reactants.

4. A process of preparing a vinyl monomer and oil modified alkyd resin comprising reacting in the presence of an inert organic solvent, an oil modified alkyd resin with 30-50% by weight, based on the total weight of the final reaction product, of a monomeric vinyl compound consisting of between 3-17.5% by weight, based on the total weight of the final reaction product, of a member of the group consisting of diallyl fumarate and diallyl maleate, wherein said oil modified alkyd resin is the reaction product of a polycarboxylic acid, a polyhydric alcohol and a glyceride oil, wherein said polycarboxylic acid consists essentially of a member of the group consisting of saturated polycarboxylic acids and phthalic acid, and is present in an amount varying between 15-45% by weight, based on the total weight of the oil modified alkyd resin, and said oil consists essentially of soya oil and is present in an amount varying between 30-65% by weight, based on the total weight of said oil modified alkyd resin, and said inert solvent having a boiling point of at least 100° C. is present in an amount varying between 20-60% by weight based on the total weight of solvent and reactants.

5. A process of preparing a vinyl monomer and oil modified alkyd resin comprising reacting in the presence of an inert organic solvent an oil modified alkyd resin with 30-50% by weight, based on the total weight of the final reaction product, of a monomeric vinyl compound consisting of between 3-17.5% by weight, based on the total weight of the final reaction product, of a member of the group consisting of diallyl fumarate and diallyl maleate, wherein said oil modified alkyd resin is the reaction product of a polycarboxylic acid, a polyhydric alcohol and a glyceride oil, wherein said polycarboxylic acid consists essentially of a member of the group consisting of saturated polycarboxylic acids and phthalic acid, and is present in an amount varying between 15-45% by weight, based on the total weight of the oil modified alkyd resin, and said oil consists essentially of corn oil and is present in an amount varying between 30-65% by weight, based on the total weight of said oil modified alkyd resin, and said inert solvent having a boiling point of at least 100° C., is present in an amount varying between 20-60% by weight based on the total weight of solvent and reactants.

6. A process of preparing a vinyl monomer and oil modified alkyd resin comprising reacting in the presence of an inert organic solvent, an oil modified alkyd resin with 30-50% by weight, based on the total weight of the final reaction product, of a monomeric vinyl compound consisting of between 3-17.5% by weight based on the total weight of the final reaction product, of a member of the group consisting of diallyl fumarate and diallyl maleate, wherein said oil modified alkyd resin is the reaction product of a polycarboxylic acid, glycerol, and a glyceride oil, wherein said polycarboxylic acid consists essentially of a member of the group consisting of saturated polycarboxylic acids and phthalic acid, and is present in an amount varying between 15-45% by weight, based on the total weight of the oil modified alkyd resin, and said oil consists essentially of a non-conjugated oil having an iodine number between 120-190 and is present in an amount varying between 30-65% by weight, based on the total weight of said oil modified alkyd resin, and said inert solvent having a boiling point of at least 100° C., is present in an amount varying between 20-60% by weight based on the total weight of solvent and reactants.

7. A process of preparing a vinyl monomer and oil modified alkyd resin comprising reacting in the presence of an inert organic solvent, an oil modified alkyd resin with 30-50% by weight, based on the total weight of the final reaction product, of a monomeric vinyl compound consisting of between 3-17.5% by weight based on the total weight of the reaction product, of a member of the group consisting of diallyl fumarate and diallyl maleate, wherein said alkyd resin is the reaction product of a polycarboxylic acid, pentaerythritol and a glyceride oil, wherein said polycarboxylic acid consists essentially of the member of the group consisting of saturated polycarboxylic acids and phthalic acid, and is present in an amount varying between 15–45% by weight, based on the total weight of the oil modified alkyd resin, and said oil consists essentially of a non-conjugated oil having an iodine number between 120–190 and is present in an amount varying between 30–65% by weight, based on the total weight of said oil modified alkyd resin, and said inert solvent having a boiling point of at least 100° C. is present in an amount varying between 20–60% by weight based on the total weight of solvent and reactants.

8. A process of preparing a vinyl monomer and oil modified alkyd resin comprising reacting in the presence of an inert organic solvent, an oil modified alkyd resin with 30–50% by weight, based on the total weight of the final reaction product, of a monomeric vinyl compound consisting of between 3–17.5% by weight, based on the total weight of the final reaction product, of a member of the group consisting of diallyl fumarate and diallyl maleate, wherein said oil modified alkyd resin is the reaction product of a polycarboxylic acid, glycerol, and a glyceride oil, wherein said polycarboxylic acid consists essentially of phthalic acid, and is present in an amount varying between 15–45% by weight, based upon the total weight of the oil modified alkyd resin, and said oil consists essentially of linseed oil and is present in an amount varying between 30–65% by weight, based on the total weight of said oil modified alkyd resin, and said inert solvent having a boiling point of at least 100° C., is present in an amount varying between 20–60% by weight based on the total weight of solvent and reactants.

9. A surface coating composition comprising a vinyl monomer and oil-modified alkyd resin comprising the reaction product of 30% to 50% by weight, based on the total weight of the final reaction product, of a monomeric vinyl compound consisting of between 3% and 17.5% by weight, based on the total weight of the final reaction product, of a member of the group consisting of diallyl fumarate and diallyl maleate, and an oil-modified alkyd resin, wherein said oil-modified resin comprises the reaction product of a polycarboxylic acid, a polyhydric alcohol, a glyceride oil, wherein said polycarboxylic acid consists essentially of a member of the group consisting of saturated polycarboxylic acids and phthalic acid, and is present in an amount varying between about 15% and 45% by weight, based on the total weight of the oil-modified alkyd resin, and wherein said oil consists essentially of a non-conjugated oil having an iodine number between 120 and 190 and is present in an amount varying between 30% and 65% by weight, based on the total weight of the said oil-modified alkyd resin.

10. A surface coating composition comprising a vinyl monomer and oil-modified alkyd resin comprising the reaction product of 30% and 50% by weight, based on the total weight of the final reaction product, of a monomeric vinyl compound consisting of between 3% and 17.5% by weight of a member of the group consisting of diallyl fumarate and diallyl maleate, and an oil-modified alkyd resin, wherein said alkyd resin comprises the reaction product of a polycarboxylic acid, glycerol and a glyceride oil, wherein said polycarboxylic acid consists essentially of phthalic acid, and is present in an amount varying between 15% and 45% by weight, based on the total weight of the oil-modified alkyd resin, and wherein said oil consists essentially of linseed oil, and is present in an amount varying between 30% and 65% by weight, based on the total weight of said oil-modified alkyd resin.

11. A surface coating composition comprising a vinyl monomer and oil-modified alkyd resin comprising the reaction product of 30% to 50% by weight, based on the total weight of the final reaction product, of a monomeric vinyl compound consisting of between 3% and 17.5% by weight of a member of the group consisting of diallyl fumarate and diallyl maleate, and an oil-modified alkyd resin, wherein said alkyd resin comprises the reaction product of a polycarboxylic acid, pentaerythritol, and a glyceride oil, wherein said polycarboxylic acid consists essentially of phthalic acid, and is present in an amount varying between 15% and 45% by weight, based on the total weight of the oil modified alkyd resin, and wherein said oil consists essentially of soya oil and is present in an amount varying between 30% and 65% by weight based on the total weight of said oil-modified alkyd resin.

12. A surface coating composition comprising a vinyl monomer and oil-modified alkyd resin, comprising the reaction product of 30% to 50% by weight, based on the total weight of the final reaction product, of a monomeric vinyl compound consisting of between 3% and 17.5% by weight, of a member of the group consisting of diallyl fumarate and diallyl maleate, and an oil-modified alkyd resin, wherein said alkyd resin comprises the reaction product of a polycarboxylic acid, ethylene glycol, and glyceride oil, wherein said polycarboxylic acid consists essentially of phthalic acid and is present in an amount varying between 15% and 45% by weight, based on the total weight of the oil-modified alkyd resin, and wherein said oil consists essentially of corn oil is present in an amount varying between 30% and 65% by weight, based on the total weight of said oil-modified alkyd resin.

13. A process of preparing a vinyl monomer and oil modified alkyd resin comprising reacting in the presence of an inert organic solvent, an oil modified alkyd resin with 30–50% by weight, based on the total weight of the final reaction product of a monomeric vinyl compound consisting of 6–12% by weight, based on the total weight of the final reaction product, of a member of the group consisting of diallyl fumarate and diallyl maleate, wherein said oil modified alkyd resin is the reaction product of a polycarboxylic acid, a polyhydric alcohol and a glyceride oil, wherein said polycarboxylic acid consists essentially of a member of the group consisting of saturated polycarboxylic acids and phthalic acid, and is present in an amount varying between 15–45% by weight, based on the total weight of the oil modified alkyd resin, said oil consists essentially of a non-conjugated oil having an iodine number between 120 and 190, and is present in an amount varying between 30 and 65% based on the total weight of said oil modified alkyd resin, and said inert solvent having a boiling point of at least 100° C. is present in an amount varying between 35% and 55% by weight based on the total weight of solvent and reactants.

14. A process of preparing a vinyl monomer and oil-modified alkyd resin comprising reacting in the presence of an inert organic solvent, an oil modified alkyd resin with 30–50% by weight, based on the total weight of the final reaction product, of a monomeric vinyl compound consisting of 6–12% by weight, based on the total weight of the final reaction product of a member of the group consisting of diallyl fumarate and diallyl maleate, wherein said oil-modified alkyd resin is the reaction product of a polycarboxylic acid, a polyhydric alcohol and a glyceride oil, wherein said polycarboxylic acid consists essentially of phthalic acid, and is present in an amount varying between 15% and 45% by weight, based on the total weight of the oil-modified alkyd resin, and said oil consists essentially of a non-conjugated oil having an iodine number between 120 and 190 and is present in an amount varying between 30% and 65% by weight, based on the total weight of said oil-modified alkyd resin and said inert solvent, having a boiling point of at least 100° C., is present in an amount varying between 35% and 55% by weight based on the total weight of solvent and reactants.

15. A process of preparing a vinyl monomer and oil-modified alkyd resin, comprising reacting in the presence of an inert organic solvent, an oil-modified alkyd resin with 30–50% by weight, based on the total weight of the final reaction product, of a monomeric vinyl compound, consisting of 6–12% by weight, based on the total weight of the final reaction product, of a member of the group consisting of diallyl fumarate and diallyl maleate, wherein said oil-modified alkyd resin is the reaction product of a polycarboxylic acid, a polyhydric alcohol and a glyceride oil, wherein said polycarboxylic acid consists essentially of a member of the group consisting of saturated polycarboxylic acids and phthalic acid and is present in an amount varying between 15–45% by weight, based on the total weight of the oil-modified alkyd resin, and said oil consists essentially of linseed oil, is present in an amount varying between 30% and 65% by weight, based on the total weight of said oil-modified alkyd resin, and said inert solvent having a boiling point of at least 100° C. is present in an amount varying between 35% and 55% by weight based on the total weight of solvent and reactants.

16. A process of preparing a vinyl monomer and oil-modified alkyd resin comprising reacting in the presence of an inert organic solvent, an oil-modified alkyd resin with 30–50% by weight, based on the total weight of the final reaction product, of a monomeric vinyl compound consisting of 6–12% by weight, based on the total weight of the final reaction product, of a member of the group consisting of diallyl fumarate and diallyl maleate, wherein said oil-modified alkyd resin is the reaction product of a polycarboxylic acid, a polyhydric alcohol and a glyceride oil, wherein said polycarboxylic acid consists essentially of a member of the group consisting of saturated polycarboxylic acids and phthalic acid, and is present in an amount varying between 15% and 45% by weight, based on the total weight of the oil-modified alkyd resin, and said oil consists essentially of soya oil and is present in an amount varying between 30% and 65% by weight, based on the total weight of said oil-modified alkyd resin, and said inert solvent having a boiling point of at least 100° C. is present in an amount varying between 35% and 55% by weight based on the total weight of solvent and reactants.

17. A process of preparing a vinyl monomer and oil-modified alkyd resin comprising reacting in the presence of an inert organic solvent an oil-modified alkyd resin with 30–50% by weight, based on the total weight of the final reaction product, of a monomeric vinyl compound consisting of 6–12% by weight, based on the total weight of the final reaction product, of a member of the group consisting of diallyl fumarate and diallyl maleate, wherein said oil-modified alkyd resin is the reaction product of a polycarboxylic acid, a polyhydric alcohol and a glyceride oil, wherein said polycarboxylic acid consists essentially of a member of the group consisting of saturated polycarboxylic acids and phthalic acid, and is present in an amount varying between 15% and 45% by weight, based on the total weight of the oil-modified alkyd resin, and said oil consists essentially of corn oil and is present in an amount varying between 30% and 65% by weight, based on the total weight of said oil-modified alkyd resin, and said inert solvent having a boiling point of at least 100° C., is present in an amount varying between 35% and 55% by weight based on the total weight of solvent and reactants.

18. A process of preparing a vinyl monomer and oil-modified alkyd resin comprising reacting in the presence of an inert organic solvent, an oil-modified alkyd resin with 30–50% by weight, based on the total weight of the final reaction product, of a monomeric vinyl compound consisting of 6–12% by weight based on the total weight of the final reaction product, of a member of the group consisting of diallyl fumarate and diallyl maleate, wherein said oil-modified alkyd resin is the reaction product of a polycarboxylic acid, glycerol, and a glyceride oil, wherein said polycarboxylic acid consists essentially of a member of the group consisting of saturated polycarboxylic acids and phthalic acid, and is present in an amount varying between 15% and 45% by weight, based on the total weight of the oil-modified alkyd resin, and said oil consists essentially of a non-conjugated oil having an iodine number between 120 and 190 and is present in an amount varying between 30% and 65% by weight, based on the total weight of said oil-modified alkyd resin, and said inert solvent having a boiling point of at least 100° C., is present in an amount varying between 35% and 55% by weight based on the total weight of solvent and reactants.

19. A process of preparing a vinyl monomer and oil-modified alkyd resin comprising reacting in the presence of an inert organic solvent, an oil-modified alkyd resin with 30–50% by weight, based on the total weight of the final reaction product, of a monomeric vinyl compound consisting of 6–12% by weight based on the total weight of the reaction product, of a member of the group consisting of diallyl fumarate and diallyl maleate, wherein said alkyd resin is the reaction product of a polycarboxylic acid, pentaerythritol and a glyceride oil, wherein said polycarboxylic acid consists essentially of the member of the group consisting of saturated polycarboxylic acids and phthalic acid, and is present in an amount varying between 15% and 45% by weight, based on the total weight of the oil-modified alkyd resin, and said oil consists essentially of a non-conjugated oil having an iodine number between 120 and 190 and is present in an amount varying between 30% and 65% by weight, based on the total weight of said oil-modified alkyd resin, and said inert solvent having a boiling point of at least 100° C. is present in an amount varying between 35% and 55% by weight based on the total weight of solvent and reactants.

20. A process of preparing a vinyl monomer and oil-modified alkyd resin comprising reacting in the presence of an inert organic solvent, an oil-modified alkyd resin with 30–50% by weight, based on the total weight of the final reaction product, of a monomeric vinyl compound consisting of 6–12% by weight, based on the total weight of the final reaction product, of a member of the group consisting of diallyl fumarate and diallyl maleate, wherein said oil-modified alkyd resin is the reaction product of a polycarboxylic acid, glycerol, and a glyceride oil, wherein said polycarboxylic acid consists essentially of phthalic acid, and is present in an amount varying between 15% and 45% by weight, based upon the total weight of the oil-modified alkyd resin, and said oil consists essentially of linseed oil and is present in an amount varying between 30% and 65% by weight, based on the total weight of said oil-modified alkyd resin, and said inert solvent having a boiling point of at least 100° C., is present in an amount varying between 35% and 55% by weight based on the total weight of solvent and reactants.

JOHN C. PETROPOULOS.
LEONARD E. CADWELL.

REFERENCES CITED

The following references are of record in the file of this patent:

UNITED STATES PATENTS

| Number | Name | Date |
|---|---|---|
| 2,392,710 | Wakeford et al. | Jan. 8, 1946 |
| 2,409,633 | Kropa | Oct. 22, 1946 |
| 2,530,315 | Rust et al. | Nov. 14, 1950 |